J. B. FALLON, Jr.
CARTON FILLING MACHINE.
APPLICATION FILED DEC. 29, 1905.
908,457.
Patented Jan. 5, 1909.
3 SHEETS—SHEET 2.
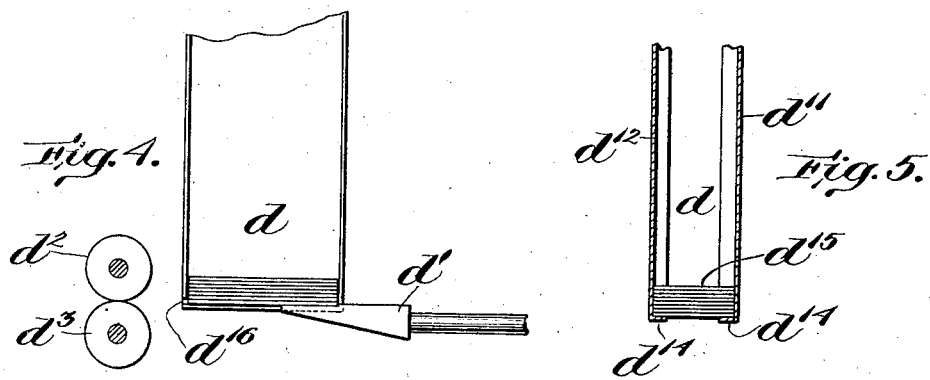
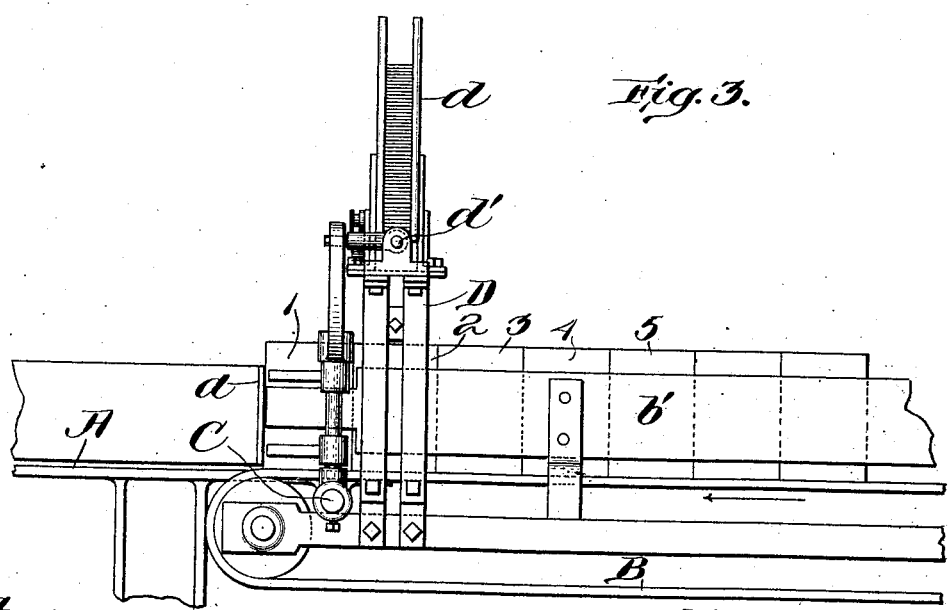
Witnesses:
Arthur F. Randall
Mary G. Hennessy
Inventor:
John B. Fallon, jr.,
by George A. Rockwell,
Attorney.

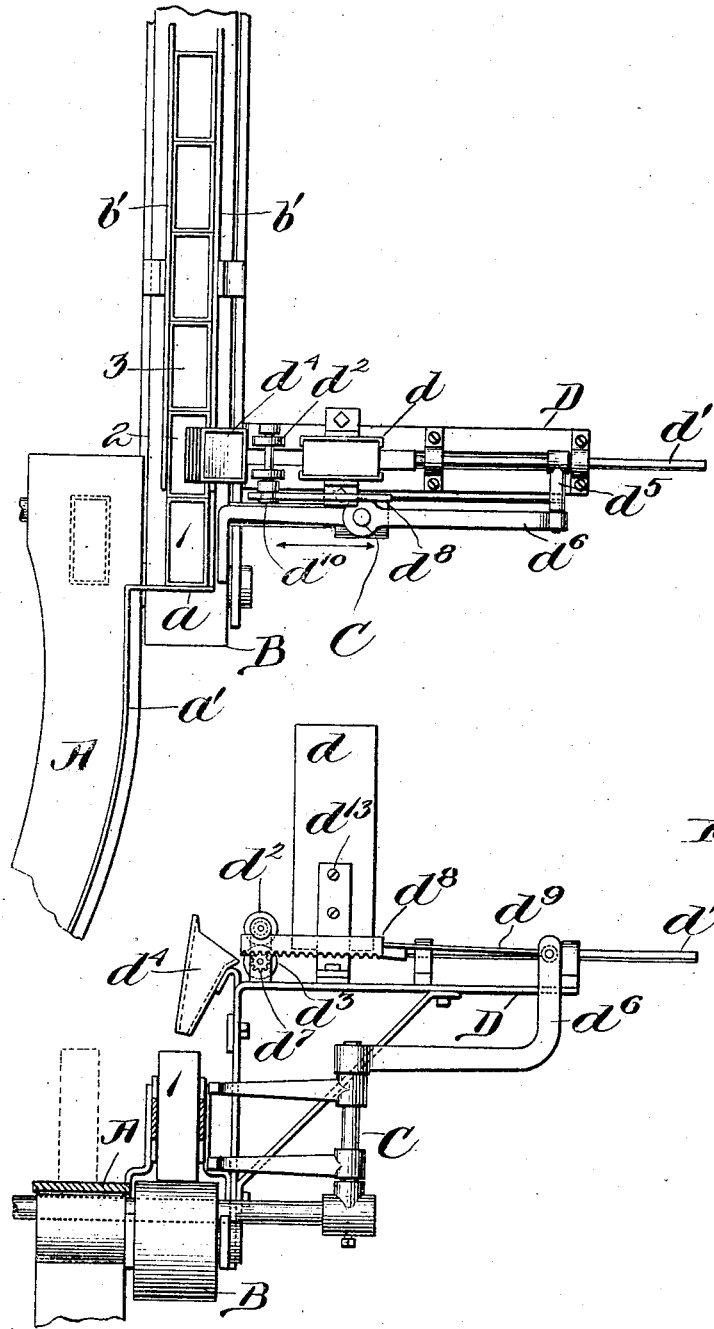

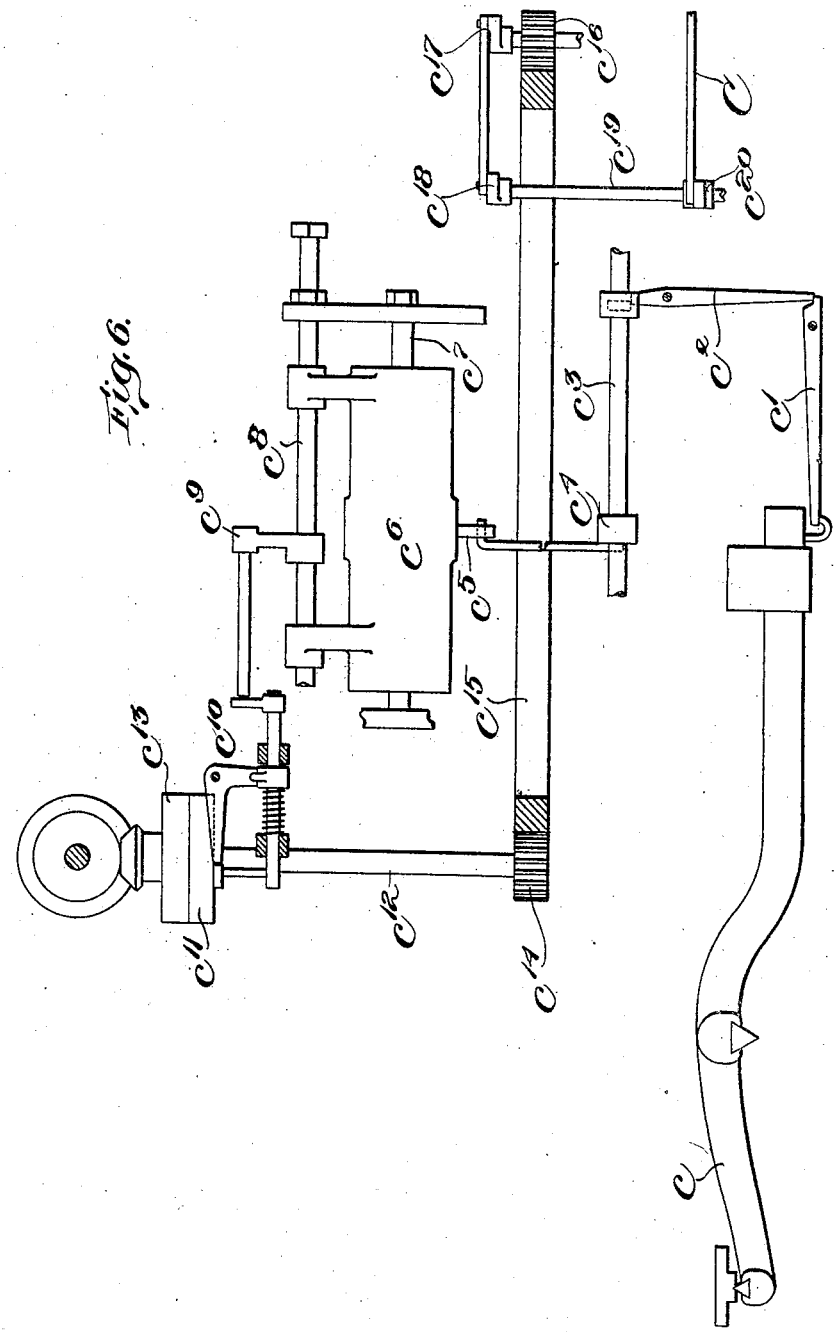

UNITED STATES PATENT OFFICE.

JOHN B. FALLON, JR., OF BOSTON, MASSACHUSETTS, ASSIGNOR TO PNEUMATIC SCALE CORPORATION LIMITED, OF QUINCY, MASSACHUSETTS, A CORPORATION OF MAINE.

CARTON-FILLING MACHINE.

No. 908,457.   Specification of Letters Patent.   Patented Jan. 5, 1909.

Application filed December 29, 1905. Serial No. 293,767.

*To all whom it may concern:*

Be it known that I, JOHN B. FALLON, Jr., of Boston, in the county of Suffolk and State of Massachusetts, have invented an Improved Carton-Filling Machine or the Like, of which the following is a description, reference being had to the accompanying drawings, in which—

Figure 1 is a plan view of part of a carton filling machine embodying my invention. Fig. 2 is a side elevation of the mechanism shown in Fig. 1. Fig. 3 is a front elevation of the mechanism shown in Fig. 1. Figs. 4 and 5 are details hereinafter described. Fig. 6 is a diagrammatic view of part of a filling and weighing machine, and is hereinafter described.

In the case of carton testing machines as well as of carton filling and weighing machines and the like, the cartons are fed one at a time to the machine and tested or filled successively and it is desirable to deposit in each carton a card or the like.

The object of my invention is to provide automatic means to deposit a card or the like in each carton as it is filled or tested—and to these ends I provide the testing or filling machine with a supplemental card feeding mechanism automatically operated in synchrony with the carton filling or testing machine so as to deposit a card or the like in each carton.

As herein shown I have embodied my invention in a carton filling and weighing machine wherein the cartons are fed one at a time from a rank which is bodily advanced step by step as each carton is removed from that rank to be filled and an important feature of my invention consists in controlling the card feeding mechanism by the weighing mechanism of the machine so that the feeding of the cards is synchronized with respect to the feed of the cartons.

Other features of my invention are hereinafter pointed out.

With reference to the drawings, A represents a portion of the circular table of a carton filling machine, such for example as is shown and described in U. S. Patent to Doble No. 716007, dated December 16, 1902. In the machine of this patent the cartons are delivered onto table A from the constantly traveling conveyer belt B by a shunter member C. That is, the cartons are placed on the conveyer belt B by any suitable means, and the constant movement of said conveyer in the direction indicated by the arrow holds the end carton 1 against an abutment $a$. When the shunter C is reciprocated, as indicated by the double arrow in Fig. 1, this end carton is shunted from the conveyer B onto table A into the position indicated by dotted lines in Fig. 1, and when shunter C returns to its normal position out of the path of the rank of cartons on the conveyer B, the latter shifts said rank bodily along until the carton 2 is against abutment $a$.

On the table A the cartons are picked up and carried forward to the filling mechanism in the usual manner by mechanism not shown in the drawings. Rails $a'$ and $b'$ $b'$ are provided to guide the cartons in their movements. As the cartons are shifted around table A they are delivered successively onto a scale-beam $c$ where they are filled and weighed. The scale-beam $c$ acts through latches $c'$ and $c^2$ to control a rock shaft $c^3$ on which is an arm $c^4$ connected by a link with a valve $c^5$ which controls a piston in a cylinder $c^6$. The rod $c^7$ of this piston connects with a slide $c^8$ carrying an arm $c^9$ which acts through a clutch shifter $c^{10}$ to control a clutch member $c^{11}$ by means of which a shaft $c^{12}$ is connected with and disconnected from the constantly driven clutch member $c^{13}$. Shaft $c^{12}$ carries a pinion $c^{14}$ in mesh with a gear ring $c^{15}$ which also meshes with a pinion $c^{16}$ on a shaft carrying a short arm $c^{17}$ connected by a link with a long arm $c^{18}$ on a shaft $c^{19}$. Shaft $c^{19}$ carries an arm $c^{20}$ that is connected with shunter C. A full description of the construction and mode of operation of this mechanism can be found in the patent above noted, it being only necessary to say here that when each carton is properly filled its weight operates beam $c$ which, through the intermediate mechanism described, shifts valve $c^5$ so as to cause the piston in cylinder $c^6$ to move to the left until arm $c^9$ acting through clutch shifter $c^{10}$ clutches member $c^{11}$ to member $c^{13}$. Thereupon gear ring $c^{15}$ is turned far enough to impart one revolution to pinion $c^{16}$ which acts through arms $c^{17}$, $c^{18}$ and $c^{20}$ and shaft $c^{19}$ to operate shunter C as above described. At the completion of each revolution of pinion $c^{16}$ shaft $c^{12}$ is automatically stopped. It will thus be seen that shunter C which controls the carton feed of the filling and weighing machine is in turn controlled by the weighing mechanism.

In accordance with my invention I provide a bracket D fixed to the frame of the filling machine, and on this bracket is mounted a receptacle $d$ holding the cards or the like that are to be deposited in the cartons. The cards, which may have advertising matter upon them, are fed forward one at a time by a pusher $d'$ mounted to slide endwise in bearings on bracket D, and this pusher delivers the cards to a pair of feed rolls $d^2$ and $d^3$ journaled on bracket D by which feed rolls the cards are projected through a chute $d^4$ into the cartons. Pusher $d'$ has fixed to it an arm $d^5$ connected with an arm $d^6$ fixed to the shunter C. The axle of the lower feed roll $d^3$ carries a pinion $d^7$ in mesh with a rack $d^8$, the latter being connected with arm $d^5$ by a rod $d^9$ so that the rack and pusher move together, with the rack guided in its to and fro movement by a flanged wheel $d^{10}$ on the axle of the upper feed roll $d^2$. Therefore each time the shunter moves to the left, Figs. 1 and 2, to shift carton 1 from belt B to table A, not only does pusher $d'$ engage the bottom card in receptacle $d$ and carry the forward end of said card between feed rolls $d^2$ and $d^3$ but the latter are rotated through the rack $d^8$ and pinion $d^7$ and deliver the card to chute $d^4$ from which it drops into carton 2, then at rest.

As shown in Figs. 4 and 5 the receptacle $d$ is made with two side pieces $d^{11}$ and $d^{12}$ supported by uprights $d^{13}$ on bracket D. The lower edges of these two side pieces are made with inwardly turned flanges $d^{14}$ on which the cards $d^{15}$ rest and the space between these two flanges $d^{14}$ serves as a passageway for the pusher $d'$. The vertical edges of the two side pieces $d^{11}$ and $d^{12}$ are also turned inwardly so as to pocket the cards $d^{15}$ and prevent their lateral displacement, except that the vertical flanges at one side of the receptacle are cut away as at $d^{16}$ to provide a passageway for the bottom card when it is shifted by the pusher $d'$.

The feeding of the cards, as will now be seen, is in synchrony with the feeding of the cartons which in machines of this class is not usually uniform or regular owing to irregularities in the delivery of the filling to the cartons. Also it will be seen that the card is fed at a time when the rank of cartons on belt B is stationary, but when the shunter C moves back to its normal position out of the path of the cartons, the latter are shifted forward by belt B thereby carrying the carton with the card in it against abutment $a$, and the next carton under chute $d^4$ in position to receive the next card which will be delivered when shunter C is again reciprocated.

The advantages of the construction above described are that the card feeding mechanism can be applied as an attachment to the usual carton filling machine without modification of the latter, and its operation is provided for by connecting it with the usual shunter C, whereby the card feeding mechanism is accurately timed with respect to the movements of the rank of cartons on belt B to deliver each card at a time when the rank is at rest. Moreover, feeding the cards into the cartons before they reach the filling mechanism and while empty makes it easier to place the card in the carton than would be the case if the cards were inserted after the cartons were filled, although I do not mean to say that it is material to my invention in its broadest aspect whether the cards are deposited in the cartons before or after the latter have been filled, or whether other additional material instead of cards is inserted in the cartons.

What I claim is:

1. In a machine of the character described the combination of means for removing the first of a rank of cartons from the rank and supplemental means controlled by said removing means for automatically depositing a card or the like in the desired cartons.

2. In a machine of the character described the combination of a shunter for removing the first of a rank of cartons from the rank, and supplemental mechanism actuated by said shunter for automatically depositing a card or the like in the desired cartons.

3. In a machine of the character described the combination with a shunter for removing the first of a rank of cartons from the rank, of supplemental mechanism connected with and actuated by the movement of the shunter for automatically depositing a card or the like in the desired cartons.

4. In a machine of the character described the combination of a shunter for removing the first of a rank of cartons from the rank; a receptacle for holding cards; supplemental feeding means for transferring the cards from the receptacle to the carton; and means connecting the feeding means with the shunter.

5. In a machine of the character described the combination of means for intermittently feeding a rank of cartons; means for removing the cartons one by one from the rank and feeding them to the filling mechanism; that filling mechanism; and supplemental means for automatically depositing a card or the like in its appropriate carton while the rank of cartons is at rest.

6. A machine for filling cartons or the like comprising means for weighing the filled cartons and supplemental means controlled by the weighing means for automatically depositing a card or the like in each carton.

7. In a machine of the character described the combination of means for filling a carton; a scale operated by a predetermined weight; means for feeding a carton to said carton-filling mechanism; supplemental mechanism for supplying a card or the like to the desired cartons; and means controlled by the scale for actuating the card-supplying mechanism.

8. In a machine of the character described the combination of a filling mechanism; a carrier for feeding a rank of cartons; means for transferring a carton from the carrier to the filling mechanism; a scale mechanism actuated by the filling of the carton, and which scale mechanism controls the carton-transferring mechanism; supplemental means for supplying a card or the like to the desired cartons; and means connecting the card-supplying and transferring mechanisms whereby the former is actuated by the latter.

9. The combination with the shunter of a machine for filling cartons or the like; of supplemental mechanism comprising a receptacle for holding cards; a pair of feed rolls; a pusher; means connecting the pusher with the shunter for actuating said pusher to transfer the cards from the receptacle to the feed rolls; and means connecting the feed rolls with the shunter for actuating the feed rolls to transfer the cards from the pusher to the cartons.

JOHN B. FALLON, JR.

Witnesses:
FRED W. BENNETT,
CHARLES E. SHERMAN.